United States Patent [19]

Martinez

[11] 4,076,285
[45] Feb. 28, 1978

[54] LAMINAR FLOW CONNECTOR FOR CONDUITS

[75] Inventor: Felix Jesus Martinez, Demarest, N.J.

[73] Assignee: Erika, Inc., Rockleigh, N.J.

[21] Appl. No.: 600,962

[22] Filed: Aug. 1, 1975

[51] Int. Cl.² ............................................. F16L 25/00
[52] U.S. Cl. ................................... 285/332; 285/376;
285/423; 285/DIG. 16
[58] Field of Search ............... 285/331, 332, 360, 361,
285/376, 391, 396, 401, 402, 423, 332.1, 332.2,
333.3, 332.4, 334.4, DIG. 16

[56] References Cited

U.S. PATENT DOCUMENTS

| 809,759 | 1/1906 | Toole et al. | 285/332.2 |
| 1,019,558 | 3/1912 | Thompson | 285/332 X |
| 1,474,586 | 11/1923 | Hanrahan | 285/331 |
| 3,616,866 | 11/1971 | Verheul et al. | 285/332 X |
| 3,876,234 | 4/1975 | Harms | 285/332 |

Primary Examiner—Dave W. Arola

Attorney, Agent, or Firm—Morgan, Finnegan, Pine, Foley & Lee

[57] ABSTRACT

A laminar flow connector for conduits including a first element having a portion for receiving a first conduit and a hollow tapered member having one end in open communication with the end of the first conduit and continuously tapering away from the first conduit toward its other end, a second element having a portion for receiving a second conduit and a mating tapered channel for receiving the hollow tapered member therein and having one end in open communication with the second conduit, and interlocking members which coact to provide a hermetic seal between the elements and enable a fluid to flow from one conduit to the other without encountering any discontinuities in the flow path. Advantageously, the interlocking members include mating pairs of spaced ramped projections capable of advancing the elements toward each other and providing a hermetic seal therebetween when the hollow tapered member is fully inserted into the mating tapered channel and the elements are rotated relative to one another.

4 Claims, 5 Drawing Figures

U.S. Patent    Feb. 28, 1978    4,076,285
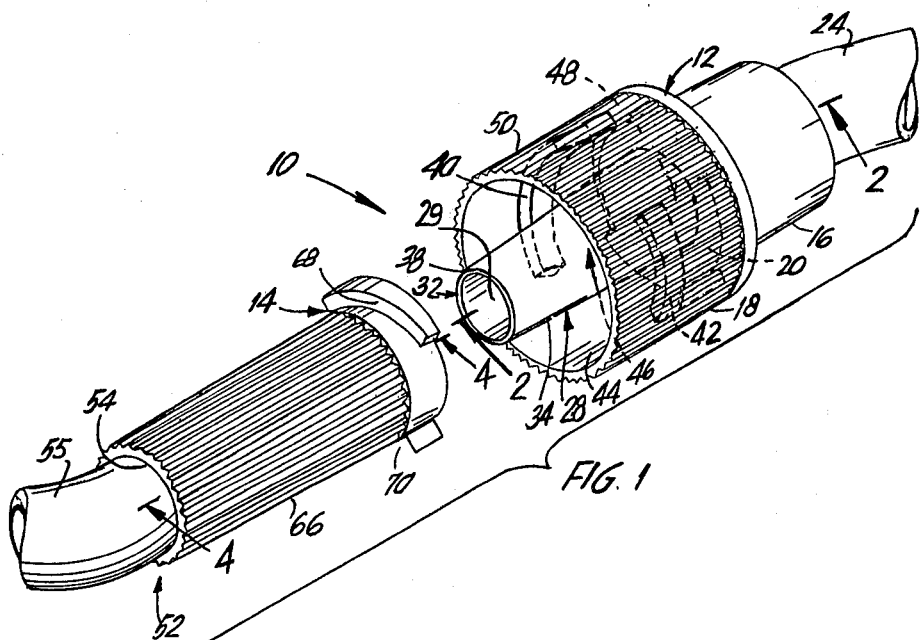
FIG. 1
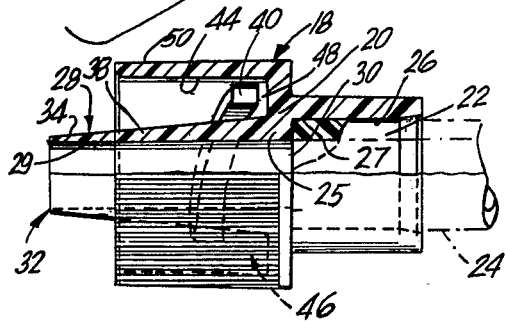
FIG. 2
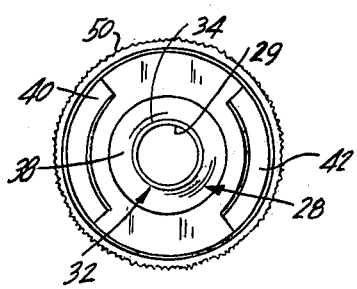
FIG. 3
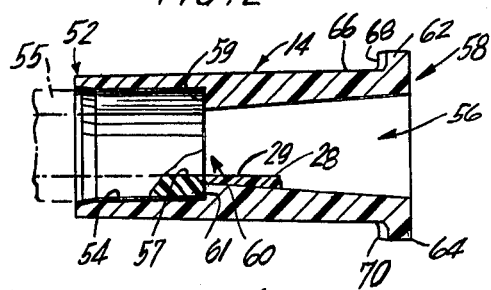
FIG. 4
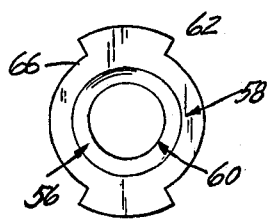

LAMINAR FLOW CONNECTOR FOR CONDUITS

The present invention relates to conduit connectors, and more specifically to a laminar flow connector with interlocking means for providing a hermetic seal between the coupled conduits.

Generally, coupling of conduits or biologically compatible tubes for medical life support apparatus, such as artificial kidney apparatus and oxygenators, is effected with connectors that introduce void areas (discontinuities) into the fluid flow path providing undesirable secondary flow conditions such as eddies, vortexes and cavitations which are highly detrimental to the integrity of the fluid (blood). Moreover, such connectors are less than satisfactory in providing a positive hermetic seal between the conduits and lack a positive coupling means to prevent accidental disengagement of the connector members.

It is an object of the present invention to provide a conduit connector which eliminates voids or discontinuities in the flow path.

It is a still further object of the present invention to provide a laminar flow conduit connector which ensures a positive hermetic seal between the coupled conduits.

It is a still further object of the present invention to provide a laminar flow conduit connector having a positive interlocking means to prevent accidental disengagement of the connector members.

Other objects, aspects, and advantages of the present invention will be apparent from the detailed description and the preferred embodiment of the invention illustrated in the drawings.

Briefly, the laminar flow connector according to the present invention includes a first element having a portion for receiving a first conduit and a hollow tapered member having one end in open communication with the first conduit and continuously tapering away from the first conduit to its other end, a second element having a portion for receiving a second conduit and a mating tapered channel for receiving the hollow tapered member and having one end in open communication with the second conduit, and interlocking means for coacting to provide a hermetic seal between the elements and enable a fluid to flow from one conduit to the other through the hollow tapered member without encountering any discontinuities in the flow path. Advantageously, the interlocking means includes mating pairs of spaced ramped projections capable of advancing the elements toward each other and provide a hermetic seal therebetween when the hollow tapered member is fully inserted into the mating tapered channel and the elements are twisted or rotated relative to one another.

Without intending to be bound solely by the specific embodiment illustrated in the drawings, the preferred embodiment of the present invention is illustrated, in which:

FIG. 1 is a perspective view of an uncoupled laminar flow connector in accordance with the present invention;

FIG. 2 is a partial sectional view of the first element of the connector taken along line 2—2 of FIG. 1;

FIG. 3 is an end view of FIG. 2;

FIG. 4 is a partial sectional view of the second element of the connector taken along line 4—4 of FIG. 1 with a portion of the first element added; and FIG. 5 is an end view of FIG. 4.

Referring to FIG. 1, a laminar flow connector in accordance with the present invention is generally illustrated at 10. The laminar flow connector 10 includes a first or male element 12 and a second or female element 14 for receiving the first element 12.

The first element 12 is advantageously formed as a stepped cylinder having a reduced diameter portion 16 and enlarged diameter portion 18 separated by an annular stop or wall 20. The reduced diameter portion 16 preferably includes a recess 22 dimensioned to receive a first conduit or tube 24. (However, it should be understood that the tube 24 may be mounted about the reduced diameter portion 16 if so desired.) The first tube 24 may be made of any artificial or natural rubber or elastomeric material, as desired. In the medical field, polyvinyl chloride tubes or other biologically compatible tubes are generally used with mass transfer devices for dialysis and oxygenation, as well as with other devices for transferring body fluids to or from a patient. The first tube 24 is positioned in the recess 22 with its end 25 abutting against annular wall 20 and the lumen 27 of the tube 24 in the same plane as inner surface 29 of a hollow tapered member 28 which extends away from the recess 22, see FIG. 2. This continuity between the lumen 27 of the tube 24 and inner surface 29 of the member 28 advantageously eliminates any void or discontinuity between the end of the tube 24 and the connector 10. Advantageously, the tube 24 is fixedly bonded to the sidewalls 26 of the recess 22 and its end 25 is fixedly bonded to the annular wall 20 with a suitable adhesive such as commercially available aromatic solvents.

The hollow tapered member 28 is centrally disposed within the enlarged diameter portion 18 and is generally in the shape of a truncated cone. Preferably, the end 30 of the member 28 having the larger cross-sectional area (larger diameter), see also FIG. 2, is integrally coupled to the annular wall 20 to provide open communication between the recess 22, and therefore tube 24, and the interior of member 28. Preferably, the member 28 is integrally formed with the annular wall 20, extends outwardly away from the recess 22 and terminates at its end 32 (apex) having the smaller cross-sectional area (smaller diameter). Advantageously, the outer surface 34 of the member 28 is tapered to provide a good wedge-fit within the second member 14, and the inner surface 36 is continuously tapered, as desired, to maintain continuity of the laminar flow, see FIG. 2. To accomplish this, the thickness of the sidewall 38 of the member 28 may be varied in proportion to the taper of the outer surface 34 to reduce the amount of taper of the inner surface 36, as desired.

Concentric with the member 28 and radially spaced therefrom is the enlarged diameter portion 18 forming an annular recess therebetween for receiving the second element 14 therein. The enlarged diameter portion 18 includes a pair of diametrically spaced projections or ribs 40 and 42 integrally coupled to its inner surface 44, see FIG. 3. The ribs 40 and 42 extend radially inwardly from the inner surface 44 and are inclined or canted (ramped) relative to the annular wall 20 to define slots 46 and 48 between the ribs 40 and 42 and the annular wall 20, respectively. Moreover, slots 46 and 48 are inclined in opposite directions relative to the wall 20 so that their openings are diametrically opposite to one another. The outer surface 50 of the enlarged diameter portion 18 is advantageously knurled in the same direction as the longitudinal axis of the element 12 to facilitate gripping and twisting of the first element 12 during coupling and uncoupling of the connector 10.

Referring to FIG. 4, the second element 14 is generally cylindrical in shape and includes an end portion 52 having a recess 54 which is preferably dimensioned to receive a second conduit or tube 55 therein, see FIG. 1. (However, it should be understood that the tube may be mounted about the end portion 52 if so desired.) A mating tapered channel 56 joins the recess 54 at its end 60 of smaller cross-sectional area forming an annular shoulder or stop 61 for the tube 55 and provides open communication between the recess 54 and channel 56 and continuously tapers toward its remote end 58 of larger cross-sectional area. The second tube 55 is positioned in the recess 54 with its end 59 abutting the annular shoulder 61 and the lumen 57 of the tube 55 in the same plane as the inner surface 29 of the end 32 of member 28. This continuity between the lumen 57 of the tube 55 and the inner surface 29 of the member 28 eliminates any voids or discontinuities between the end of the tube 55 and the end 32 of member 28.

A pair of diametrically spaced projections or tabs 62 and 64 are integrally coupled to the outer surface 66 of the second element 14 at its end 58 and extend radially outward therefrom, see also FIG. 5. As most clearly seen in FIG. 1, the rear surfaces 68 and 70 of the projections 62 and 64 are inclined or canted (ramped) in opposite directions relative to the end 58 to mate with the ramped surfaces of the ribs 40 and 42 of the slots 46 and 48 and move the elements 12 and 14 toward one another to provide a hermetic seal therebetween. Advantageously, the outer surface 66 of the first element is knurled, in the same direction as the longitudinal axis of the element 14, over a substantial portion thereof to facilitate gripping and twisting of the second element 14 during coupling and uncoupling of the connector 10.

To obtain a hermetic seal (fluid-tight connection) between the first tube 24 and the second tube 55, which are fixedly coupled to the first element 12 and second element 14, respectively, the hollow tapered member 28 of the first element 12 is fully inserted into the mating tapered channel 56 of the second member 14 and the elements 12 and 14 are rotated, e.g., ¼ turn, in opposite directions, or one element 12 or 14 may be rotated relative to the other element, as desired, so that projections 62 and 64 are received in slots 46 and 48 with the inclined surfaces of the ribs 40 and 42 and the inclined surfaces 68 and 70 of projections 62 and 64 engaging and moving relative to one another to advance the elements 12 and 16 toward one another and provide a fluid-tight-wedge-fit therebetween. As seen in FIG. 4, after coupling of the elements 12 and 14, the end 32 of the member 28 abuts the end 59 of the tube 55 with the inner surface 29 of the end 32 of the member 28 meeting the lumen 57 of the tube 55 in substantially the same plane to eliminate any voids or discontinuities which would cause secondary flow paths to the fluid circulating between the conduits 24 and 55, thereby causing turbulence in the flow path, resulting, e.g., in blood damage.

Uncoupling of the connector 10 is attained by twisting or rotating the coupled elements 12 and 14 in a manner similar to, but in a direction opposite to that used for coupling the elements 12 and 14.

From the foregoing, it is apparent that laminar flow characteristics are maintained for fluid flowing from one conduit to another conduit by eliminating any discontinuities (abrupt stops or changes) in the flow path between the conduits. Advantageously, laminar flow characteristics are maintained regardless of the direction of flow.

It should be understood by those skilled in the art that various modifications may be made in the present invention without departing from the spirit and scope thereof, as described in the specification and defined in the appended claims.

What is claimed is:

1. A laminar flow connector for coupling first and second conduits to provide a hermetic seal therebetween, comprising:

a male member in the shape of a stepped cylinder having a reduced diameter portion and enlarged diameter portion separated by an annular wall, said reduced diameter portion being dimensioned to receive a first conduit therein with the end of the first conduit abutting against said annular wall, a truncated conical member centrally arranged within said enlarged diameter portion and coupled to said annular wall at its base, said member having an inner and an outer surface, said inner surface being in open communication with said reduced diameter portion and said outer surface having a continuous taper toward its apex, said first conduit and member inner surface being so constructed and arranged to provide laminar flow of a fluid therethrough, and a pair of projections on the inside surface of said enlarged diameter portion, said projections extending radially inwardly therefrom and being spaced from said annular wall to form a pair of receiving slots; and a female member in the shape of a cylinder having an end portion with a recess with an annular stop, said recess being dimensioned to receive a second conduit therein with the end of the second conduit abutting against the annular stop and a mating tapered channel in open communication with said recess and having its largest diameter portion at the other end remote from said end portion, and a pair of mating tabs coupled to the other end of said female member remote from said end portion, said mating tabs being received within said slots upon full insertion of said male member into said female member and relative rotation of said members, said projections and said tabs coacting to provide a wedge-fit therebetween and a continuous hermetic seal between said truncated conical member and mating tapered channel and the apex end of said conical member is presented in smooth continuous flow relationship with the end of said second conduit, whereby a laminar flow path is created between the conduits through said truncated conical member.

2. The laminar flow connector recited in claim 1, wherein:

the lumen of the first conduit meets the inner surface of said truncated conical member in substantially the same plane;

the lumen of the second conduit meets the inner surface of said truncated conical member in substantially the same plane and said apex of said truncated conical member abuts against the end of the second conduit when said elements are coupled.

3. The laminar flow connector recited in claim 1, wherein:

said projections of said male member are canted in opposite directions relative to said annular wall to provide openings for said slots at the opposite ends thereof;

each of said pair of mating tabs of said female member being inclined to be received within one of said slots to provide a wedge-fit therein.

4. The laminar flow connector recited in claim 3, wherein:

said tabs of said female member extend radially outward at said other end of said mating tapered channel and have their rear surfaces inclined in opposite directions relative to said other end.

* * * * *